(12) United States Patent
Shimazu et al.

(10) Patent No.: US 6,338,472 B1
(45) Date of Patent: Jan. 15, 2002

(54) MIST ATOMIZER AND MIST ATOMIZING DEVICE FOR FUEL CELLS

(75) Inventors: Takashi Shimazu; Hiroshi Aoki, both of Aichi-ken (JP)

(73) Assignee: Kabushiki Kaisha Toyota Chuo Kenkyusho, Aichi gun (JP)

( * ) Notice: Subject to any disclaimer, the term of this patent is extended or adjusted under 35 U.S.C. 154(b) by 0 days.

(21) Appl. No.: 09/572,428

(22) Filed: May 17, 2000

(30) Foreign Application Priority Data

May 17, 1999 (JP) .......................................... 11-135312

(51) Int. Cl.$^7$ ................................................. B01F 3/04
(52) U.S. Cl. ............................ 261/78.2; 261/29; 429/12
(58) Field of Search ........................... 261/29, 30, 78.2, 261/DIG. 65, DIG. 85; 429/12

(56) References Cited

U.S. PATENT DOCUMENTS

| 2,532,224 A | * 11/1950 | Collins et al. | ............. 261/78.2 |
| 2,966,312 A | * 12/1960 | Wilson, Jr. et al. | ......... 261/78.2 |
| 4,050,677 A | * 9/1977 | Benthin | ..................... 261/78.2 |
| 5,256,352 A | * 10/1993 | Snyder et al. | ............. 261/78.2 |

FOREIGN PATENT DOCUMENTS

| JP | 57-42362 | 3/1982 |
| JP | 5-54900 | 3/1993 |
| JP | 10-255828 | 9/1998 |

OTHER PUBLICATIONS

U.S. Ser application No. 09/391,617, filed Sep. 7, 1999, pending.

\* cited by examiner

*Primary Examiner*—C. Scott Bushey
(74) *Attorney, Agent, or Firm*—Oblon, Spivak, McClelland, Maier & Neustadt, P.C.

(57) ABSTRACT

Mists atomized from siphon type two-fluid nozzles 14a and 14b are made to collide with each other within a secondary gas intake conduit 16 and secondary gas is supplied toward a collision point of the mists. A flow control plate 22 is provided within the secondary gas intake conduit 16 at a point upstream from the collision point to ensure that the secondary gas does not interfere with the collision of the mists and also to promote fine mists generated by the collision of the mists to mix with the secondary gas. Further, a secondary nozzle 24 is provided at the tip of the secondary gas intake conduit 16 to jet the secondary gas including the fine mists from the secondary nozzle 24. In the case of applying this mist atomizer 10 to the fuel cell 30, droplets and liquid water in the process gas is separated and removed at the mounting portion of the mist atomizer 10 in order to selectively supply mist of equal-sized particles only into the fuel cell. The collected water is stored in the supply water tank temporarily and supplied again to the two-fluid nozzle for reuse.

16 Claims, 6 Drawing Sheets

MIST ATOMIZER AND MIST ATOMIZING DEVICE FOR FUEL CELLS

BACKGROUND OF THE INVENTION

1. Field of the Invention

The present invention relates to a mist atomizer and a mist atomizing device for fuel cells. More particularly, the present invention relates to a mist atomizer for atomizing mists, for example to humidify process gases to be supplied to electrodes of a solid polymer fuel cell, and a mist atomizing device for fuel cells using the mist atomizer.

2. Description of Related Art

Conventionally, this type of mist atomizer is used as a humidifier device for process gases supplied to an anode or a cathode of a solid polymer fuel cell (the process gases are a fuel gas in the case of anode and an oxidizing gas in the case of cathode). A solid polymer fuel cell is a type of fuel cell that generates electromotive force (electric energy) by electrochemical reactions in which protons generated from a fuel supplied to the anode transfer to the cathode through an electrolyte membrane and react with an oxidizing gas supplied to the cathode to produce water.

In order to operate the solid polymer fuel cell normally, it is necessary to keep the electrolyte membrane in an appropriate wet state. A general practice to meet this end is to humidify process gases such as a fuel gas supplied to the anode or an oxidizing gas supplied to the cathode by adding mists or steams thereto.

One example of a fuel cell comprising this type of humidifier device using mists is a solid polymer fuel cell disclosed in Japanese Unexamined Patent Publication No. HEI 5-54900. The solid polymer fuel cell comprises a process gas humidifier device for adding mists to a fuel gas or an oxidizing gas by using a mist atomizer having a spray nozzle or an ultrasound atomizer apparatus.

Application of the humidifier device using mists to a fuel cell is advantageous in that mists are transferred as they are to the electrode on the process gases as a carrier, and thus the amount of humidifying water is quantitatively controlled. Further, there is another advantage. That is, the process gases are deprived of latent heat of evaporation when the mists atomize into steams, a cooling effect is expected to take place on the process gases.

Figure 7:
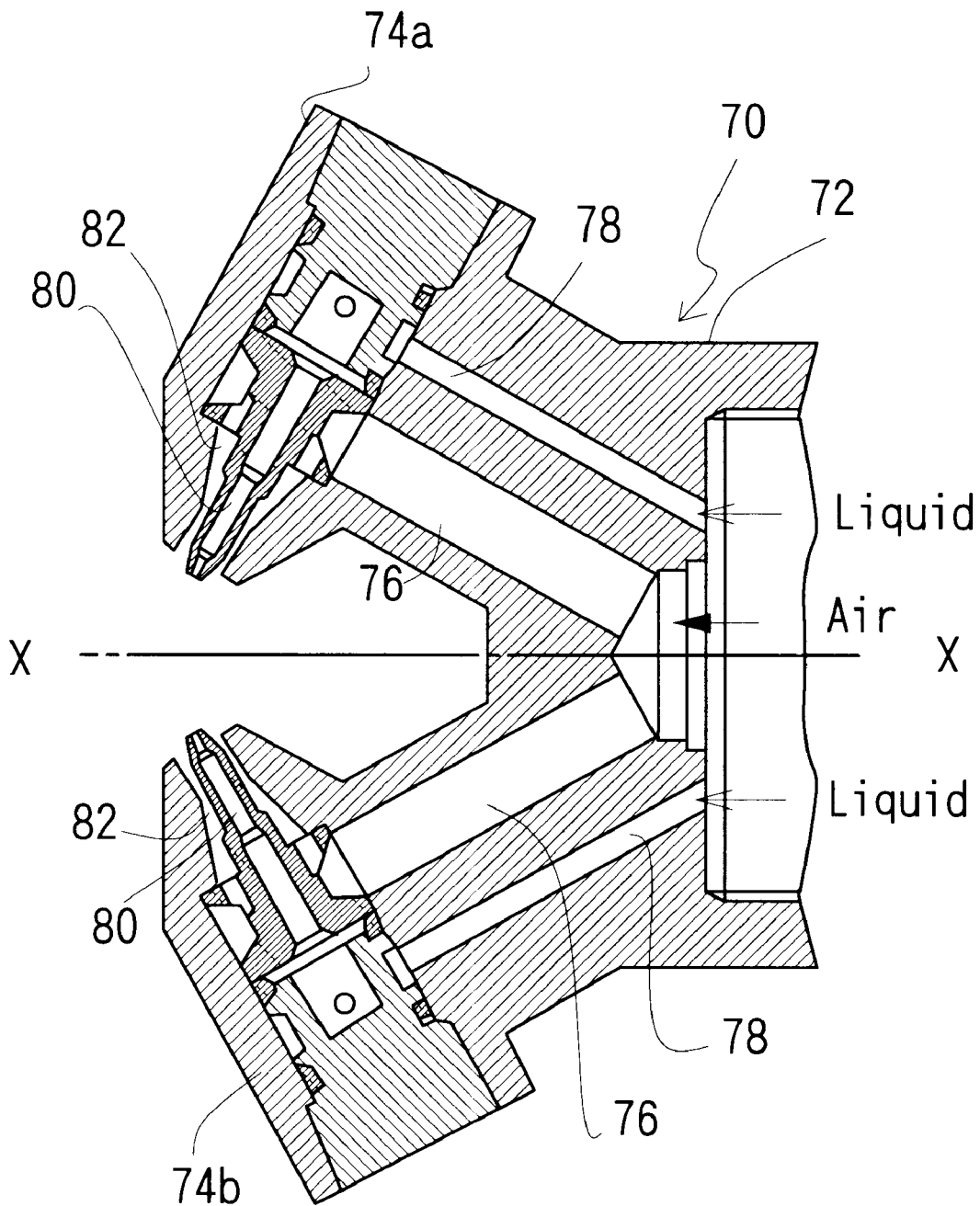

On the other hand, one preferred embodiment of this type mist atomizer, an example of which is shown in FIG. 7, is disclosed in Japanese Unexamined Patent Publication No. SHO 57-42362 although its use is not limited to fuel cells. A mist atomizer 70 disclosed in this publication comprises a plurality of (two, in this figure) nozzle heads 74a and 74b spaced uniformly with respect to the central axial line X—X of a nozzle assembly 72. Each of the nozzle heads 74a and 74b has an air intake conduit 76 and a liquid intake conduit 78 each for introducing pressurized air and liquid respectively. Further, each of the nozzle heads 74a and 74b is provided with a two-fluid nozzle at a particular crossing angle which has a double-pipe construction comprising an air discharge conduit 82 and a liquid discharge conduit 80.

In the case of the mist atomizer disclosed in this publication, pressurized air is supplied through the gas intake conduit 76 accommodated in each of the nozzle heads 74a and 74b. When the pressurized air is atomized from the air discharge conduit 80, liquid supplied through the liquid conduit 78 is sucked into the liquid discharge conduit 82 and atomized therefrom to generate mists. In addition, the mists atomized from each of the nozzle heads 74a and 74b collide with each other at a point of intersection on the central axis line X—X, and fine mists having particles of ten microns or less are generated through the collision of the jets.

The mist atomizer disclosed in the above-mentioned Japanese Unexamined Patent Publication No. SHO 57-42362 is capable of effectively generating fine mists and of diffusing the mists in the air. However, an order of tens of meters (m) of a spatial extent is required to diffuse the generated mists evenly. In other words, the mist atomizer disclosed in this publication is effective to evenly humidify a wide space such as a room, a factory or a hospital.

On the other hand, in the case of the above-described fuel cell, for the sake of miniaturization of a fuel cell (ensuring its vehicle-mountability) and high power output and high output density of the fuel cell, a gas channel provided in the fuel cell is extremely narrow and inside of the gas channels is a closed space which requires pressure control. In addition, since another components such as a gas supply source are connected by pipes and the like, a sufficient space required to diffuse mists atomized from the two-fluid nozzle can not be secured. For this reason, mere application of the conventional mist atomizer using a two-fluid nozzle to a fuel cell ends up with a problem. That is, since the generated mists are not diffused sufficiently and collide with an inner wall of the channel, the mists are trapped on the wall before being converted into electric power.

In addition, since the utilization efficiency of water supplied to the two-fluid nozzles becomes extremely low, there is a problem that is the need to keep a larger amount of supply water. Further, liquid pools undesirably generated within the channel may be a factor to cause closing of a gas flow (flooding), which hinders stable generation of electric power.

SUMMARY OF THE INVENTION

The present invention has been made in view of the above circumstances and has an object to overcome the above problems and to provide a mist atomizer capable of generating fine mists (about 30 $\mu$m or less in diameter) in a stable and continues manner even in a closed space which requires pressure control.

Another object of the present invention is to apply such a high-performance mist atomizer to a humidifier device for maintaining electrolyte membranes of a solid polymer fuel cell in an appropriate wet state so as to provide a mist atomizing device for fuel cells which can achieve stable performance of the fuel cell.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the present invention, as embodied and broadly described herein, a mist atomizer comprises a plurality of two-fluid nozzles arranged so that mists atomized therefrom collide with each other, and a secondary gas intake conduit for supplying a secondary gas toward a collision point of the mists.

In addition, it is preferred that the mist atomizer of the present invention further comprises flow control means for preventing the secondary gas from interfering with collision of the mists, and for promoting fine mists generated by the collision to mix with the secondary gas. Also, it is preferred that the mist atomizer further comprises a secondary nozzle disposed at a downstream end of the secondary gas intake conduit for promoting the fine mists generated by the collision of the mists to mix with the secondary gas, and for reducing a cross sectional spray area of the secondary gas.

According to the mist atomizer of the present invention having a construction as above, mists atomized from each two-fluid nozzle collide with each other at a point within the secondary gas intake conduit, thereby generating fine mists. In addition, since the secondary gas is supplied toward the collision point of the mists, the fine mists generated by the collision are accelerated by the secondary gas and promoted to mix with the secondary gas. Also, by provision of flow control means in the secondary gas intake conduit, the secondary gas is prevented from interfering with the collision of the mists atomized from each two-fluid nozzle, and the thus generated fine mists are promoted to mix with the secondary gas. Further, if the secondary nozzle is disposed at the tip of the secondary gas intake conduit, the flow of the secondary gas including the fine mists is restricted its width by the secondary nozzle upon being atomized therefrom.

Accordingly, this mist atomizer is capable generating fine mists (about 30 $\mu$m or less in diameter) in a stable and continuous manner even in a closed space where pressure control is necessary. Further, since two-fluid nozzles are applied to this mist atomizer, pressure loss can be kept low and fine mists can be generated from a small amount of supply of gas. Still further, since the fine mists are sufficiently mixed with the secondary gas in a small area and the cross sectional spray area when atomizing the fine mists is made small, it is possible to supply the fine mists into a narrow channel of the fuel cell.

In another aspect of the present invention, a mist atomizing device for fuel cells according to the present invention which humidifies a process gas to be supplied to a fuel cell using mists, the device comprises a mist atomizer, separating means for separating coarse droplets included in the process gas discharged from the mist atomizer, and water supplying means for supplying water to the two-fluid nozzles The mist atomizer comprises a plurality of two-fluid nozzles arranged so that mists atomized therefrom collide with each other and a secondary gas intake conduit for supplying a secondary gas toward a collision point of the mists.

In this case, it is preferred that the mist atomizer further comprises flow control means for preventing the process gas from interfering with collision of the mists, and for promoting fine mists generated by the collision to mix with the process gas. In addition, it is preferred that the mist atomizer further comprises a secondary nozzle disposed at a downstream end of the secondary gas intake conduit for promoting the fine mists generated by the collision of the mists to mix with the process gas, and for reducing a cross sectional spray area of the process gas.

Further, it is preferred that the water supplying means is a supply water tank for collecting the droplets separated by the separating means. In addition, it is preferred that the supply water tank is disposed internally of the fuel cell, and the separating means is a communicating hole which connects a lower tip of the mist atomizer to the supply water tank. Alternatively, it is preferred that the supply water tank is disposed externally of the fuel cell, and the separating means is a collecting conduit which connects a lower tip of the mist atomizer to the supply water tank. In addition, it is preferred that the mist atomizing device for fuel cells according to the present invention further comprising a circulating conduit for supplying the water which has been collected in the supply water tank to the two-fluid nozzles.

Further, it is preferred that the mist atomizing device for fuel cells according to the present invention further comprises a main gas conduit for supplying the process gas to the secondary gas intake conduit, and a branch gas conduit which is branched off from the main gas conduit for supplying part of the process gas to the two-fluid nozzles. In this case, it is preferred that the mist atomizing device for fuel cells further comprising a reflux gas conduit for introducing the process gas running through the branch gas conduit back into the main gas conduit, and a selector valve disposed at a joint portion of the reflux gas conduit and the branch gas conduit for letting the process gas running through the branch gas conduit into one selected from the two-fluid nozzles and the main gas conduit.

According to this mist atomizing device for fuel cells, since the mist atomizer adds fine mists to the process gas, the fine mists flow smoothly through a complicated channel of the fuel cell despite its abrupt enlargement and reduction in diameter and curves. Accordingly, collision of the fine mists with the wall and adherence of the fine mists to the wall are suppressed so that the fine mists are prevented from adhering to the wall. As the result, the fine mists can be distributed into each cell evenly so as to keep electrolyte membranes in an appropriate wet state through the anode or the cathode so that a stable performance of the fuel cell is ensured.

Further, if coarse droplets undesirably generated due to adherence of the fine mists with one another are separated from the process gas to be collected into the supply water tank and if the collected water is supplied to the two-fluid nozzles, the collected liquid water is reused and therefore, a total amount of water that is required to be held in order to humidify a fuel cell is reduced. Here, in order to humidify the fuel cell using a two-fluid nozzle stably, it is required that pressure within the supply water tank and pressure within an spray field of the two fluid nozzle be even. The mist atomizing device for fuel cells according to the present invention satisfies this requirement for pressure control because the circulating conduit is provided to connect the spray field and the supply water tank.

BRIEF DESCRIPTION OF THE DRAWINGS

The accompanying drawings, which are incorporated in and constitute a part of this specification, illustrate embodiments of the present invention and, together with the description, serve to explain the objects, advantages and principles of the invention. In the drawings:

FIG. 1 is a cross sectional view showing a schematic construction of a mist atomizer consistent with one preferred embodiment of the present invention;

FIG. 2 is a sectional view of the mist atomizer shown in FIG. 1 taken along the line A—A seen from the direction of the arrow;

FIG. 3 is a cross sectional view showing a schematic construction of a mist atomizing device for fuel cells consistent with one preferred embodiment using the mist atomizer shown in FIGS. 1 and 2;

FIG. 4 is a cross sectional view showing a schematic construction of a mist atomizing device for fuel cells consistent with another preferred embodiment using the mist atomizer;

FIG. 5 is a cross sectional view showing a schematic construction of a mist atomizing device for fuel cells consistent with yet another preferred embodiment using the mist atomizer;

FIG. 6 is a cross sectional view showing a schematic construction of a mist atomizing device for fuel cells consistent with yet another preferred embodiment using the mist atomizer; and FIG. 7 is a cross sectional view showing one preferred embodiment of a conventionally known mist atomizer.

DETAILED DESCRIPTION OF THE PREFERRED EMBODIMENTS

Figure 1:
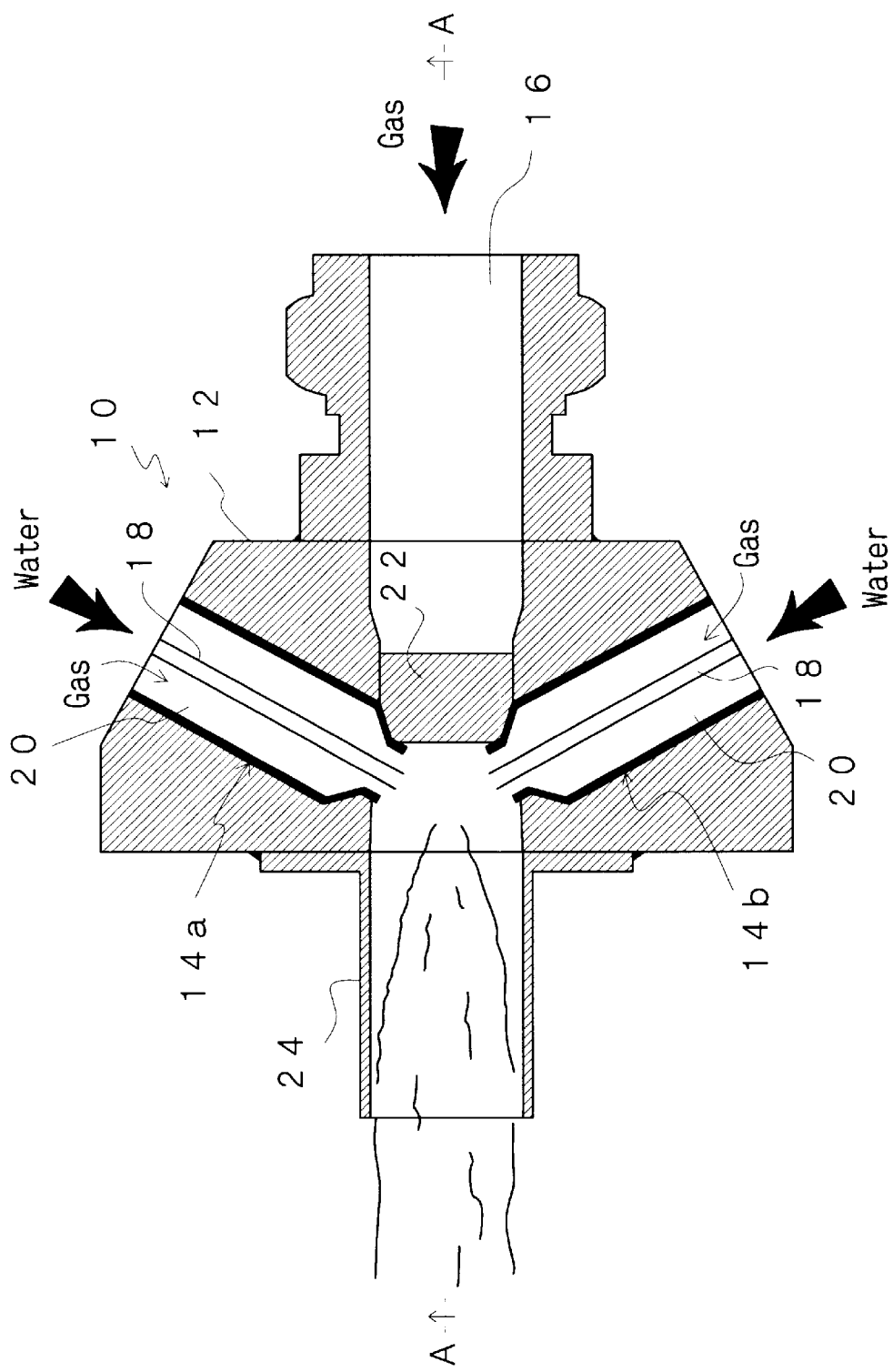
Figure 2:
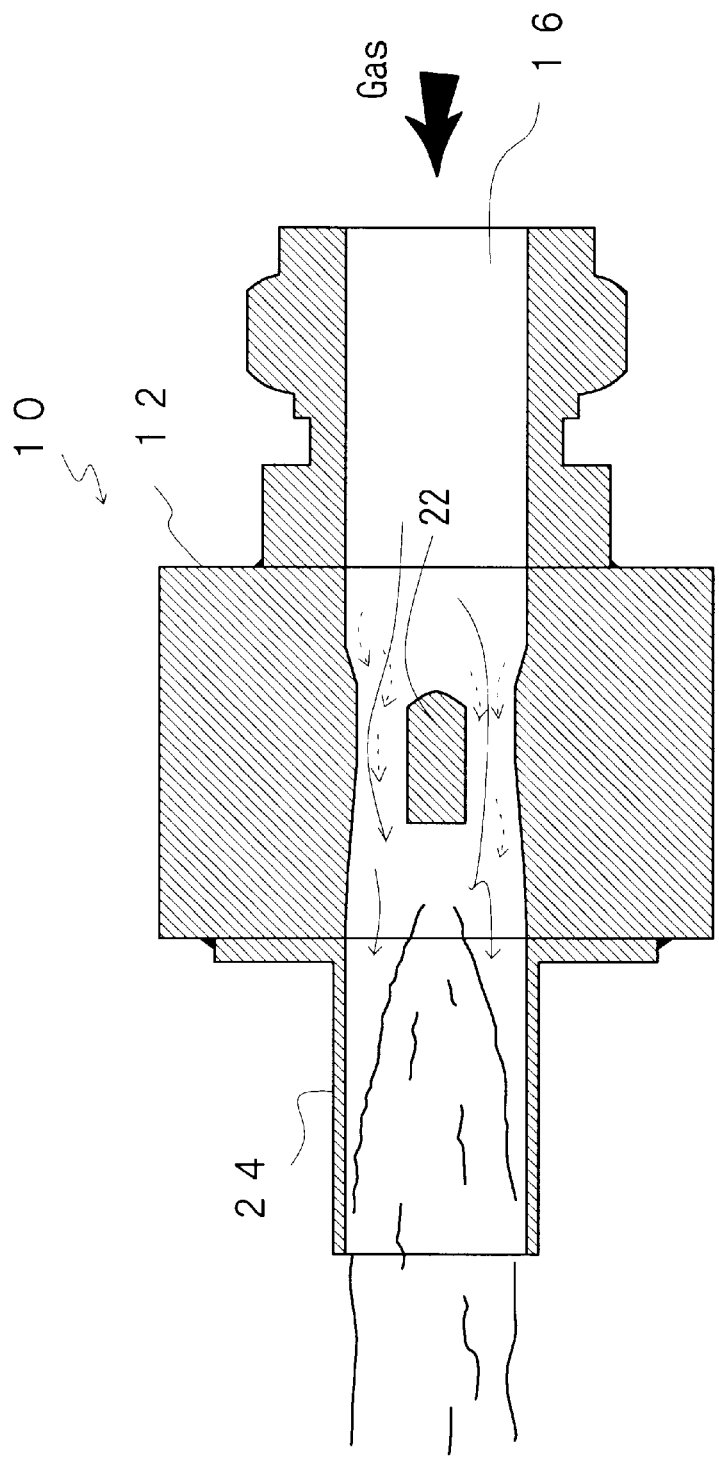

A detailed description of one preferred embodiment embodying the present invention will now be given referring to the accompanying drawings. FIGS. 1 and 2 are cross sectional views showing a schematic construction a mist atomizer consistent with this preferred embodiment. This mist atomizer 10 comprises a nozzle assembly 12 of a block shape which is provided with a plurality of (two, in this preferred embodiment) two-fluid nozzles 14a and 14b of a non-premixing siphon type, and a secondary gas intake conduit 16 for introducing a secondary gas to fine mists generated by collision of the mists atomized from the two-fluid nozzles 14a and 14b. Due to this introduction of the secondary gas, the fine mists are accelerated and promoted to mix with the secondary gas. In this case, a gas for generating mists and the secondary gas running through the secondary gas intake conduit may be air, O2, H2, a reformate gas or the like.

Each of the two-fluid nozzles 14a and 14b has a double-pipe construction: each of the fluid nozzles is provided with a gas supply conduit 20 disposed along its axis for supplying the gas for generating mists from an unillustrated supply pump, and each of the gas supply conduits 20 is further provided with a liquid supply conduit 18 disposed along its axis. The tip of the gas supply conduit 20 is constructed to have a small diameter at the tip of the liquid supply conduit 18. Owing to this construction, when the gas for generating mists is discharged from the gas supply conduit 20, negative pressure is produced around the tip portion by vortex effect. Because of the negative pressure, water in the liquid supply conduit 18 is sucked out and atomized therefrom as mists.

Each of the two-fluid nozzles 14a and 14b is arranged inclined slightly so that mists atomized from each two-fluid nozzle collide with each other at a point on a center line of the secondary gas intake conduit 16. Although there are two two-fluid nozzles 14a and 14b arranged in symmetrical relation with each other about the centerline of the secondary gas intake conduit 16 in this embodiment, three or more two-fluid nozzles may be arranged. In that case, it is preferred that each two-fluid nozzle is evenly spaced around the secondary gas intake conduit 16.

In the secondary gas intake conduit 16, a flow control plate 22 is arranged slightly upstream from a point where mists atomized from the two-fluid nozzles collide and almost at the center in the cross section perpendicular to the center axis of the secondary gas intake conduit 16. The flow control plate 22 serves two functions: it prevents the secondary gas that is pressure-fed into the secondary gas intake conduit 16 from interfering with the collision of the mists; and it promotes the thus generated fine mists (less than about 30 μm in diameter) to mix with the secondary gas.

Further, the secondary gas intake conduit 16 for atomizing the fine mists generated by collision of the mists is provided with a secondary nozzle 24 at the downstream end thereof. The secondary nozzle 24 atomizes the fine mists that are accelerated by the secondary gas and promoted to mix with the secondary gas.

In the mist atomizer 10 constructed as above, the mists atomized from the two-fluid nozzles 14a and 14b collide heavily with each other at a point within the secondary gas intake conduit 16 thereby generating fine mists having particles of less than about 30 μm in diameter. The fine mists are accelerated by the secondary gas, simultaneously promoted to mix with the secondary gas, and then atomized from the secondary nozzle 24. At this time, the flow of the secondary gas within the secondary gas intake conduit 16 is divided into two by the flow control plate 22 accommodated therein. As the result, the flows bypass the collision point of the mists so as not to interfere with the collision of the mists atomized from the two-fluid nozzles 14a and 14b. Therefore, the atomized mists are ensured to be of fine particles. In addition, upon running along an inner wall surface of the secondary gas intake conduit 16, the divided flows of the secondary gas compress and control a spray shape of the fine mists in a direction of the central axis of the secondary gas intake conduit 16. Thereafter, the divided flows of the secondary gas join together at a point downstream from the collision point. As the result, the fine mists and the secondary gas are promoted to mix together.

Thereafter, the flow of the fine mists is restricted in its width by passing through the secondary nozzle 24 upon being atomized therefrom so that the fine mists are atomized from the secondary nozzle 24 after having been sufficiently mixed up with the secondary gas and reduced in its cross-sectional spray area. This makes it possible to supply the fine mists atomized from the secondary nozzle 24 into a narrow channel.

This mist atomizer 10 may be applied, for example, to a humidifier device for humidifying process gases to be supplied to fuel cells. In this case, if coarse droplets and liquid water are separated and removed from the process gas atomized from the mist atomizer 10 at a mounting portion thereof, the resulting mists can be of uniform particles in size. As the result, it is possible to selectively supply only the fine mists into a fuel cell. In the case of applying this mist atomizer to fuel cells, the fine mists flow smoothly through complicated channels with abrupt enlargement and reduction in diameter and curves. Therefore, collision of the fine mists with the walls is suppressed drastically, and hence adherence of the fine mists on the wall is prevented. As the result, it is possible to deliver the fine mists evenly to each unit cell so that electrolyte membranes are maintained in an adequate wet state through an anode and a cathode of each fuel cell, thereby achieving stable performance of the fuel cell.

In the case of applying this mist atomizer to a fuel cell, in addition, if the liquid water that is collected at the mounting portion is returned to the two-fluid nozzles 14a and 14b and reused, it serves to increase the utilization efficiency of the water as well as to facilitate the pressure control in the tip portion of each nozzle, which has been a problem associated with a siphon type two-fluid nozzle.

Figure 3:
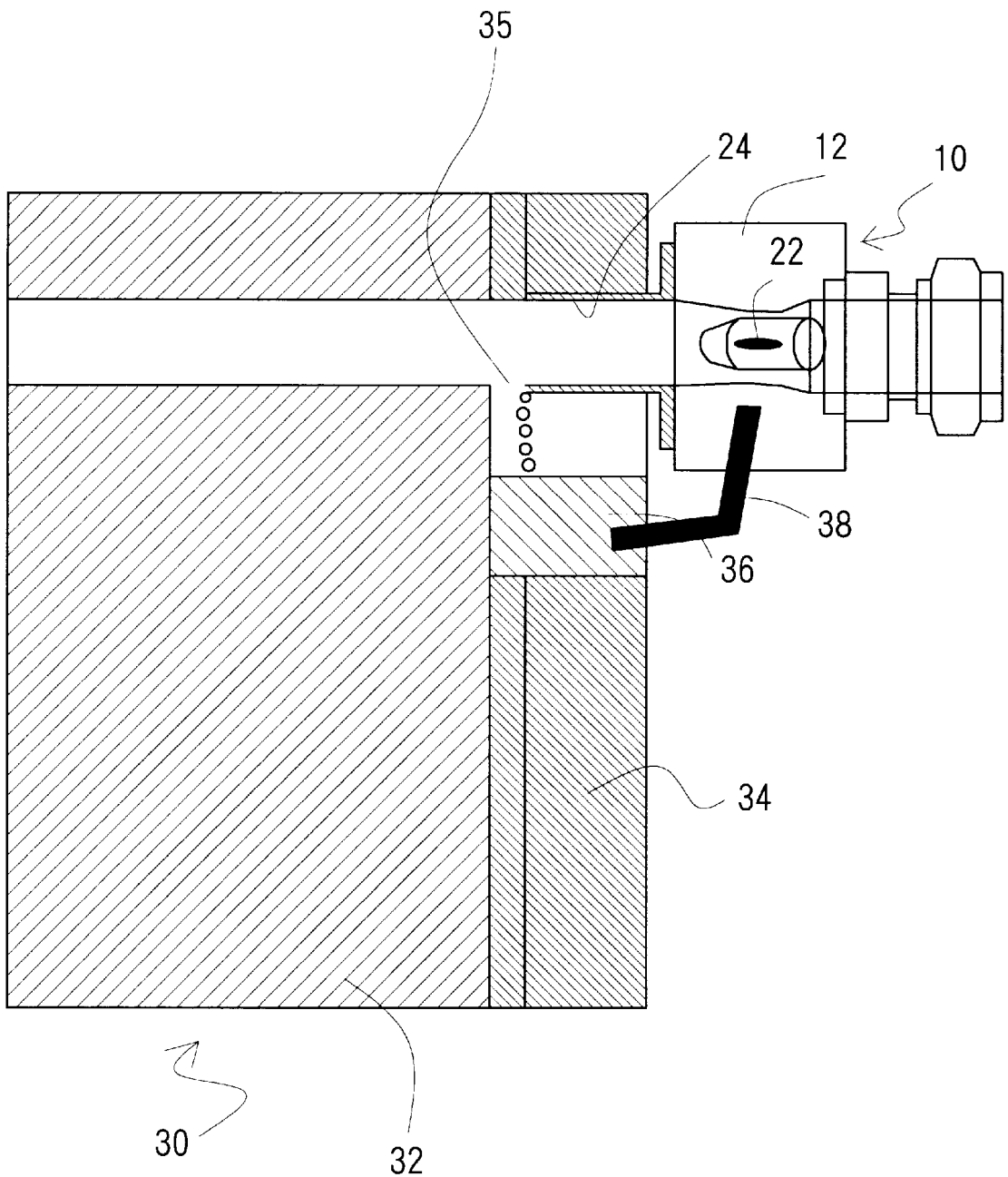
Figure 4:
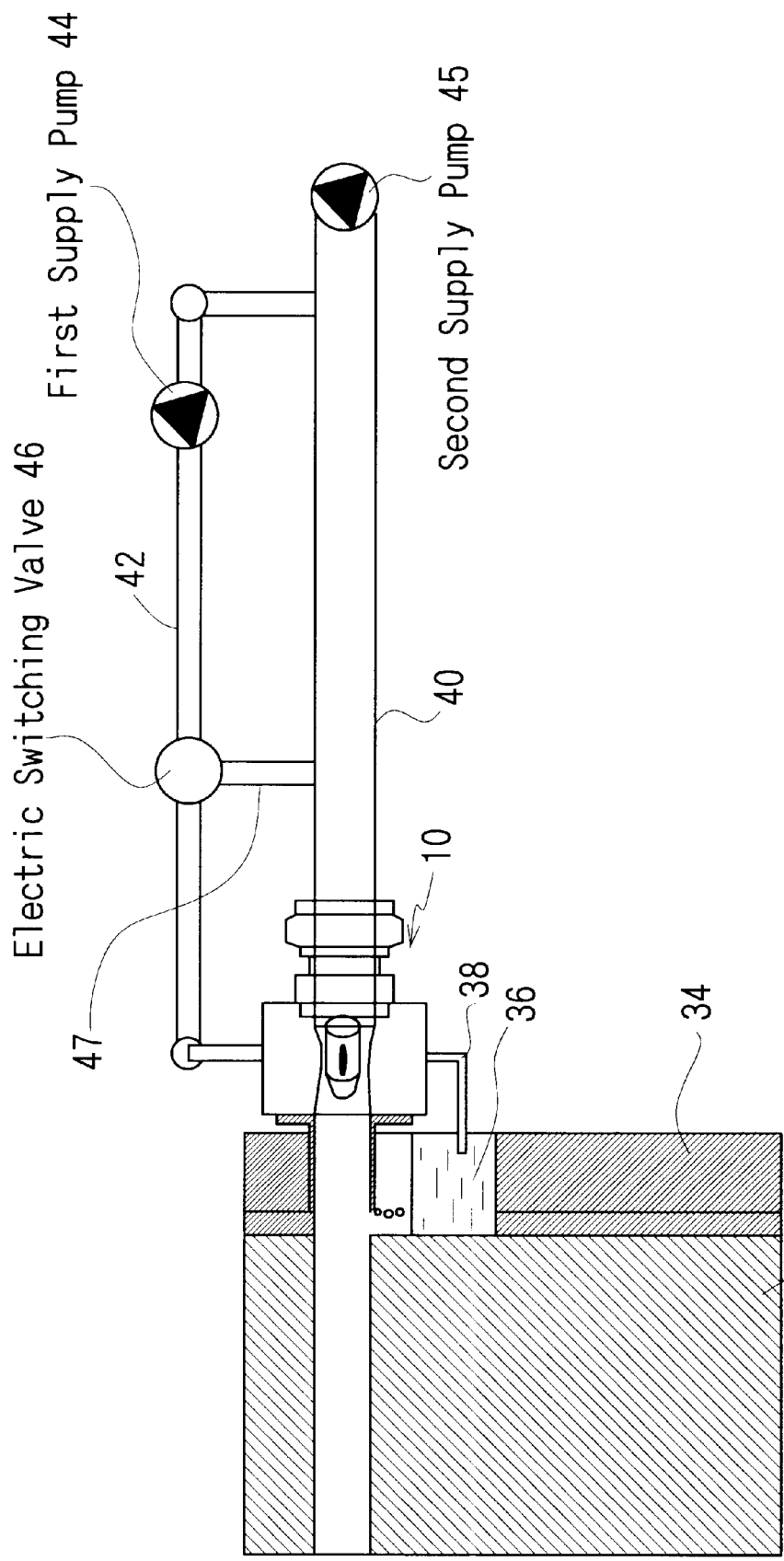
Figure 5:
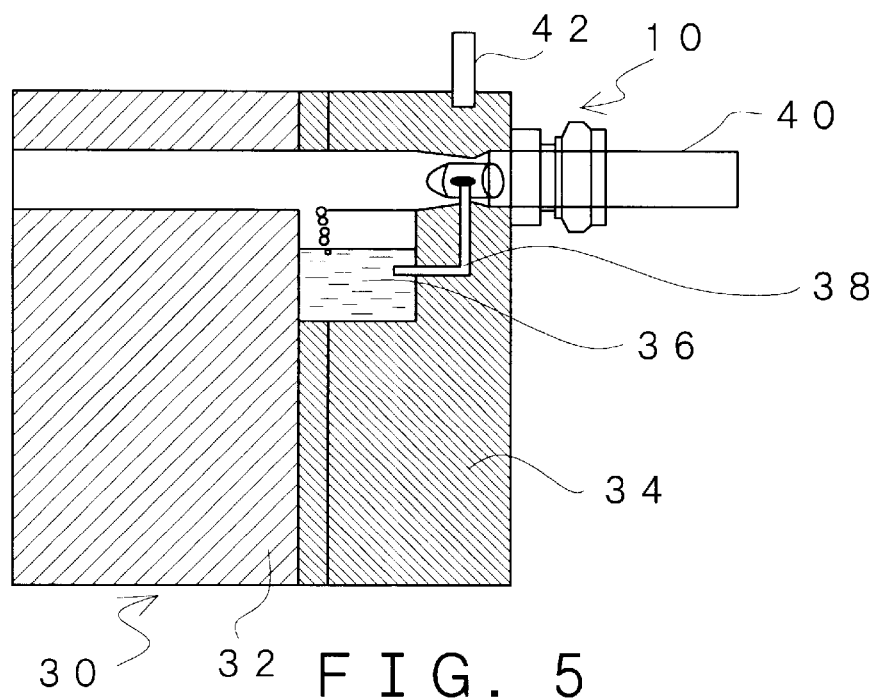
Figure 6:
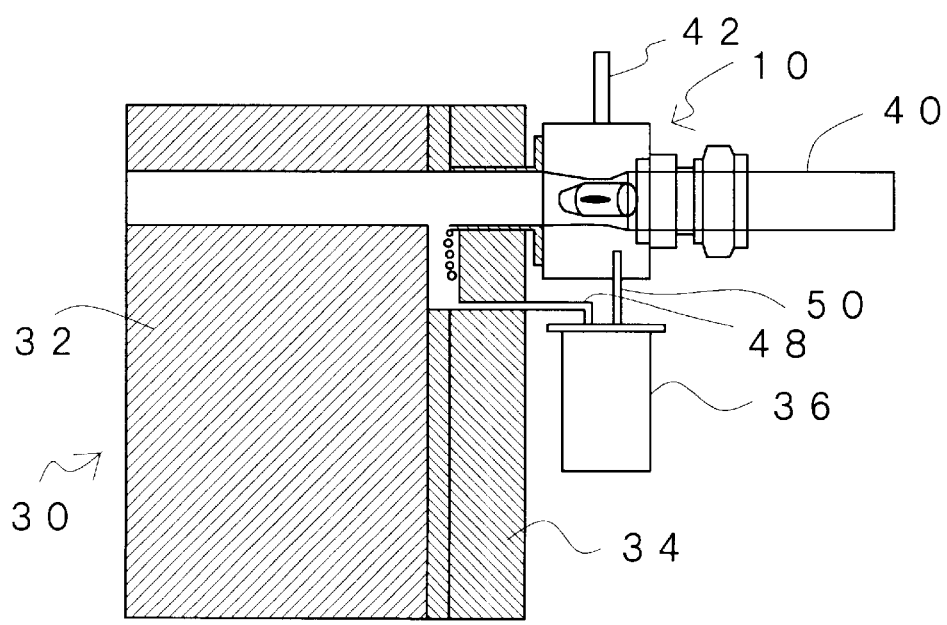

FIGS. 3–6 show examples in which the mist atomizer 10 consistent with the above embodiment is applied to a fuel cell. First, FIG. 3 shows a mist atomizing device for fuel cells consistent with the first preferred embodiment. In FIG. 3, there are a number of unit cells laminated in a fuel cell 30, and the mist atomizer 10 is mounted to an end plate 34 which is provided at the end of a unit cell 32.

In this case, for example, fine mists generated by the above mist atomizer may be introduced either or both to a fuel gas supplied to an anode and/or to an oxidizing gas supplied to a cathode of the fuel cell 30. The example which will be described hereinafter is applicable to the both cases where the fine mists are introduced to a fuel gas or to an oxidizing gas.

Here, in the example shown in FIG. 3, the mist atomizer 10 consistent with this preferred embodiment is mounted to the end plate 34 of the fuel cell 30, and the fuel cell 30 is constructed to introduce the fine mists which are generated by the mist atomizer 10 into the unit cell 32. In this example, in addition, a supply water tank 36 is disposed to the end plate 34 of the fuel cell 30 for collecting coarse droplets and liquid water upon introducing the fine mists generated by the mist atomizer 10 into the fuel cell 30 through the secondary nozzle 24. Further, the secondary nozzle 24 is in communication with the supply water tank 36 at the lower tip thereof through a communicating hole 35 in order to separate coarse droplets and liquid water included in the fine mists generated by the mist atomizer 10 and collect the same into the supply water tank 36.

As described above, in this example shown in FIG. 3, fine mists generated by the mist atomizer 10 are introduced into the fuel cell 30, upon this time, the flow of the fine mists is restricted in its width by the secondary nozzle 24, and therefore the fine mists can be supplied effectively into narrow channels in the fuel cell.

The mists atomized from the two-fluid nozzles 14*a* and 14*b* are ensured to be of fine particles by collision therebetween within the mist atomizer 10. This is because the flow control plate 22 ensures the collision. Further, the mixing of the fine mists with the process gas is promoted, thereby ensuring the fine mists to be mixed with the process gas uniformly even in a small area. Still further, a cross-sectional area of process gas spray area is effectively reduced owing to the secondary nozzle 24, thus, the fine mists can be supplied into narrow channels. Still further, it is ensured to generate fine mists having particles of about 30 $\mu$m or less in diameter which can smoothly flows the gas flow in a stable and continuous manner.

In case where the mists partly adhere to the wall before being introduced into the fuel cell, the thus generated liquid water is separated and collected from the process gas so as to prevent and restrict the liquid water from remaining inside the fuel cell. In addition, separation of the coarse droplets and liquid water serves to reduce occurrences of adherence to the wall drastically within the fuel cell.

Further, since only the fine mists, which are highly mixable with the process gas, can selectively be supplied, it is possible to supply the fine mists into complicated channels in the fuel cell. Accordingly, it is possible to prevent flooding of the electrodes caused by the residual liquid water remaining inside. Simultaneously, the fine mists can be supplied to each cell evenly, and thus stable performance of the fuel cell is ensured.

FIG. 4 shows another example of a mist atomizing device for fuel cells. In this example, the liquid water that has been collected into the supply water tank 36 is circulated to the mist atomizer 10 for reuse. In the example shown in FIG. 4, the supply water tank 36 mounted to the end plate 34 of the fuel cell 30 is in communication with the mist atomizer 10 through a circulating conduit 38. Also, in FIG. 4, there are provided a main gas conduit 40 for introducing the process gas into the secondary gas intake conduit 16 and a branch gas conduit 42 which is branched off from the main gas conduit 40 for supplying the process gas to the two-fluid nozzles 14*a* and 14*b*. A fist supply pump 44 is disposed in communication with the branch gas conduit 42 for controlling the flow rate of the gas for generating mists. The branch gas conduit 42 is also in communication with the main gas conduit 40 through a reflux gas conduit 47, and there is provided an electric switching valve 46 at a joint portion of the branch gas conduit 42 and the reflux gas conduit 47. Further, the main gas conduit 40 is provided with a second supply pump 45 for controlling the flow rate of the process gas supplied thereto.

In this example shown in FIG. 4, the process gas is introduced into the secondary gas intake conduit 16 of the mist atomizer 10 through the main gas conduit 40. The process gas is also introduced into each of the two-fluid nozzles 14*a* and 14*b* through the branch gas conduit 42. At this time, the electric switching valve 46 exerts control so as to, or not to, atomize the process gas from the two-fluid nozzles 14*a* and 14*b*. Because of this, the concentration of mists in the process gas within the fuel cell 30 is controlled, and thus, the electrolyte membranes are maintained in an appropriate wet state. As the result, stable performance of the fuel cell is ensured. In addition, in the case where the mists are not generated, the process gas goes back to the main gas conduit 40 through the reflux gas conduit 47 and therefore, the flow rate of the process gas supplied to the fuel cell can be kept invariant. Moreover, the two-fluid nozzles are capable of generating mists using a sufficiently small amount of gas supply relative to a supply amount of the process gas which is a direct factor of energy conversion, so that the power load imposed on the supply pump 44 is extremely small.

In addition, if the liquid water that has been collected into the supply water tank 36 is recirculated into the mist atomizer 10 for reuse, the heat loss may be reduced. That is, the collected water tends to be elevated in its temperature while remaining in the fuel cell due to the internal heat (heat loss) thereof. Therefore, recirculating the high temperature liquid water and reusing the same as atomized mists contributes to suppress the heat loss.

Further, generating mists from high temperature water (for example at 80° C.) stimulates vaporization (evaporation) of the generated mists. As the result, the utilization efficiency of the supplied mists is further improved and thus the water control is further facilitated. In addition, there is another advantage that humidifying control can be effected using both mists and steams together.

FIG. 5 shows another example of a mist atomizing device for fuel cells. In the case of this example, the mist atomizer 10 itself is integrated into the end plate 34, and the branch gas conduit 42 is directly disposed to the end plate 34 for introducing the process gas into two fluid nozzles 14*a* and 14*b*. Also, the supply water tank 36 and the circulating conduit 38 are accommodated within the end plate 34. As previously mentioned, the supply water tank 36 is for collecting liquid water undesirably generated by adherence of the mists generated by the mist atomizer 10 in order to supply the collected water for generating mists, and the circulating conduit 38 is for connecting the supply water tank 36 and the mist atomizer 10.

If the end plate of the fuel cell is constructed as above with the branch gas conduit 42 and the circulating conduit 38 integrally disposed therein, the end plate 34 can be used also as the block-shaped casing of the mist atomizer 10 itself. This construction achieves reduction of the manufacturing cost and downsizing a fuel cell system thereby gaining further advantages such as improvement of the vehicle-mountability.

In the case of a mist atomizer for fuel cells shown in FIG. 6, the supply water tank for collecting liquid water generated at the mist atomizer 10 is disposed externally of the fuel cell 30. The liquid water is collected at the lower tip of the mist atomizer 10 which is accommodated in the end plate 34 of the fuel cell 30, and goes into the supply water tank 36 through a collecting conduit 48. Thereafter, the liquid water collected in the supply water tank 36 is introduced again into the mist atomizer 10 through a liquid supply conduit 50. This construction eliminates the need to provide the supply water tank 36 in the end plate 34 of the fuel cell 30.

Up to this point, various preferred embodiments have been described. Since the mist atomizer in each preferred embodiment uses two-fluid nozzles of a non-premixing siphon type, a small amount of supply gas is sufficient to atomize mists. In addition, since fine mists are generated by collision thereof, the distance from the nozzle tip required to obtain fine mists may be shortened. Besides that, upon mixing the secondary gas with the fine mists generated thereby, the flow control plate aids the collision of the mists and to mix with the secondary gas further. Also, the cross-sectional spray area atomized from the secondary nozzle 24 is effectively reduced.

In the case of applying this mist atomizer to a mist atomizing device for fuel cells, if there is provided means to separate and collect coarse droplets and liquid water at its mouthing portion, fine and even mists are supplied into the fuel cell after having been mixed sufficiently with secondary gas. The fine mists supplied into the fuel cell flow smoothly through complicated gas channels with abrupt enlargement and reduction in diameter and abrupt curves. Thus, collision of the fine mists with the wall is reduced drastically. As the result, the adherence of the fine mists on the wall is prevented and the fine mists are distributed to each cell evenly. Accordingly, an electrolyte membrane in each cell is maintained in an appropriate wet state so that a stable performance of the fuel cell is ensured.

Here, if the liquid water that has been separated and collected from the process gas at the mounting portion of the mist atomizer is stored in the supply water tank temporarily and sucked out by suction force produced by the two-fluid nozzles for reuse, the utilization efficiency of water is improved. At the same time, pressure in the nozzle tip and the supply water tank can be set equal with each other, and thus the fine mists are supplied constantly in an adequate amount. That is, if ON/OFF control is exerted on an amount of gas for generating mists in accordance with the operating condition of the fuel cell, it is possible to supply fine mists constantly in a calculated amount. Further, the electrolyte membranes are maintained in a stable wet state so that the performance of the fuel cell is further stabilized.

The present invention is not limited to the preferred embodiments described above, and modifications and variations can be made without departing from the principles of the present invention. For example, although all of the above preferred embodiments are concerned with the examples in which the mist atomizer of the present invention is applied to a fuel cell, it goes without saying that the mist atomizer of the present invention is applicable in other uses.

The foregoing description of the preferred embodiments of the invention has been presented for purposes of illustration and description. It is not intended to be exhaustive or to limit the invention to the precise form disclosed, and modifications and variations are possible in the light of the above teachings or may be acquired from practice of the invention. The embodiments chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A mist atomizer comprising:
    a plurality of two-fluid nozzles arranged so that mists atomized therefrom collide with each other;
    a secondary gas intake conduit for supplying a secondary gas toward a collision point of said mists; and
    flow control means for preventing said secondary gas from interfering with collision of said mists, and for promoting fine mists generated by said collision to mix with said secondary gas.

2. The mist atomizer according to claim 1, wherein said plurality of two-fluid nozzles are arranged inclined in a manner such that a tip of each of said nozzles points in a direction downstream of said secondary gas intake conduit.

3. The mist atomizer according to claim 1, wherein said plurality of two-fluid nozzles are arranged symmetrical with respect to a center line of said secondary gas intake conduit.

4. The mist atomizer according to claim 1, wherein said flow control means is a flow control plate disposed upstream from the collision point of said mists for dividing a cross sectional area of said secondary gas conduit into two.

5. The mist atomizer according to claim 1, further comprising a secondary nozzle disposed at a downstream end of said secondary gas intake conduit for promoting said fine mists generated by the collision of said mists to mix with said secondary gas, and for reducing a cross sectional spray area of said secondary gas.

6. The mist atomizer according to claim 5, wherein said flow control means is a flow control plate disposed upstream from the collision point of said mists for dividing a cross sectional area of said secondary gas conduit into two.

7. A mist atomizing device for fuel cells which humidifies a process gas to be supplied to a fuel cell using mists, the device comprising:
    a mist atomizer as claimed in claim 1;
    separating means for separating coarse droplets included in said process gas discharged from said mist atomizer; and
    water supplying means for supplying water to said two-fluid nozzles.

8. The mist atomizing device for fuel cells according to claim 7, wherein said mist atomizer further comprises flow control means for preventing said process gas from interfering with collision of said mists, and for promoting fine mists generated by said collision to mix with said process gas.

9. The mist atomizing device for fuel cells according to claim 7, wherein said mist atomizer further comprises a secondary nozzle disposed at a downstream end of said secondary gas intake conduit for promoting said fine mists generated by the collision of said mists to mix with said process gas, and for reducing a cross sectional spray area of said process gas.

10. The mist atomizing device for fuel cells according to claim 7, wherein said mist atomizer further comprises:
    flow control means for preventing said process gas from interfering with collision of said mists, and for promoting said fine mists generated by said collision to mix with said process gas; and
    a secondary nozzle disposed at a downstream end of said secondary gas intake conduit for promoting said fine mists to mix with said process gas, and for reducing a cross sectional spray area of said process gas.

11. The mist atomizing device for fuel cells according to claim 7, wherein said water supplying means is a supply water tank for collecting said droplets separated by said separating means.

12. The mist atomizing device for fuel cells according to claim 11, wherein said supply water tank is disposed internally of said fuel cell, and said separating means is a communicating hole which connects a lower tip of said mist atomizer to said supply water tank.

13. The mist atomizing device for fuel cells according to claim 11, wherein said supply water tank is disposed externally of said fuel cell, and said separating means is a collecting conduit which connects a lower tip of said mist atomizer to said supply water tank.

14. The mist atomizing device for fuel cells according to claim 11, further comprising a circulating conduit for supplying the water which has been collected in said supply water tank to said two-fluid nozzles.

15. The mist atomizing device for fuel cells according to claim 7, further comprising:

a main gas conduit for supplying said process gas to said secondary gas intake conduit; and a branch gas conduit which is branched off from said main gas conduit for supplying part of said process gas to said two-fluid nozzles.

16. The mist atomizing device for fuel cells according to claim 15, further comprising:

a reflux gas conduit for introducing said process gas running through said branch gas conduit back into said main gas conduit; and a selector valve disposed at a joint portion of said reflux gas conduit and said branch gas conduit for letting said process gas running through said branch gas conduit into one selected from said two-fluid nozzles and said main gas conduit.

* * * * *